United States Patent [19]
Frohlich et al.

[11] 3,836,413
[45] Sept. 17, 1974

[54] METHOD OF AND APPARATUS FOR THERMOFIXING OF SLIDE-FASTENER COUPLING CHAINS

[76] Inventors: Alfons Frohlich, Veddershang 5; Franz Hochlehnert, Gladbecker Str. 363, both of Essen, Germany

[22] Filed: Aug. 28, 1972

[21] Appl. No.: 284,402

Related U.S. Application Data
[63] Continuation of Ser. No. 4,870, Jan. 22, 1970, abandoned.

[30] Foreign Application Priority Data
Aug. 23, 1969 Germany.............................. 1942935

[52] U.S. Cl................. 156/73, 29/207.5 R, 29/408, 156/66, 156/93, 156/306, 156/380
[51] Int. Cl............................................ B32b 31/20
[58] Field of Search.......... 29/207.5 R, 408; 156/73, 156/306, 38 D, 66, 93

[56] References Cited
UNITED STATES PATENTS
3,485,691  12/1969  Waldes ................................ 156/88
3,703,026  11/1972  Uhrie............................... 29/408 X
3,750,260   8/1973  Jakob.................................. 29/408

*Primary Examiner*—Edward G. Whitby
*Attorney, Agent, or Firm*—Karl F. Ross; Herbert Dubno

[57] ABSTRACT

A method of and an apparatus for the fixing or setting of continuous coupling elements or chains, preferably in the form of meandering or coiled monofilament, wherein the coupling element is passed about a drum with predetermined coupling-head spacing through a station at which an ultrasonic transducer thermally sets the coupling element. Juxtaposed with the periphery of the transport wheel, which maintains the spacing of the turns or undulations of the coil or the meander, is a radially reciprocable member constituting the vibration source or the anvil against which the vibrator operates.

4 Claims, 10 Drawing Figures

FIG.8
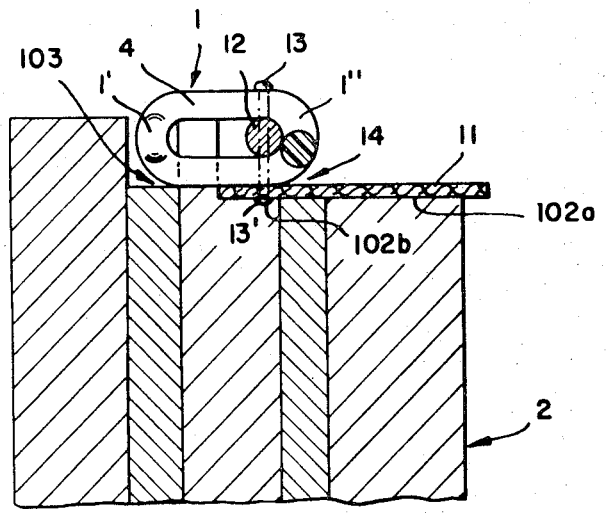
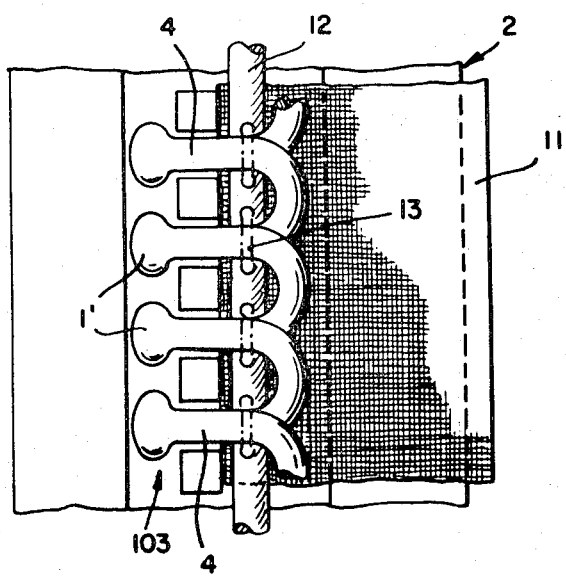
FIG.9

METHOD OF AND APPARATUS FOR THERMOFIXING OF SLIDE-FASTENER COUPLING CHAINS

This is a continuation of application Ser. No. 4,870, filed 22 Jan. 1970, now abandoned.

The present invention relates to a method of and an apparatus for the setting of slide-fastener coupling elements and, more particularly, to a system for the thermal fixing of continuous coupling elements, especially coupling coils or meanders.

It has heretofore been the practice thermally to set synthetic resin monofilament, after an initial shaping, to form the coupling element for slide fasteners by subjecting the coupling element to a temperature in the region of its softening point or, at any rate, a temperature at which the synthetic resin becomes plastically deformable. Such coupling elements are generally in the form of coils which may be helical or of flattened configuration with the individual turns forming respective coupling heads interfittable with the coupling heads of a mating coupling element on the opposing slide-fastener half when a slider is drawn along the coupling coils.

The heads may be formed in part by a deformation of the synthetic resin of each turn so as to flatten the heads somewhat and allowing the interfitting heads of the two coupling elements to engage behind one another and restrict relative lateral displacement and resist forces tending to separate the coupling elements.

Another form of coupling element, to which the present invention is applicable, is a so-called "meander," the coupling element here being continuous but deposited or bent in zig-zag or undulating configuration so as to form a row of coupling heads with intervening spaces. Here again the coupling heads of one of the meanders are designed to interfit with the coupling heads of the mating meander when the slider is drawn in one direction along the slide fastener, and to separate when the slider is drawn in the opposite direction.

Both the undulations of the meander and the turns of a coil-type coupling element, have shanks extending away from the coupling heads, which may be flattened or enlarged as described earlier, the shanks being affixed to a support band or tape, the tape in turn being stitched to a garment or other fabric or nonfabric article having an opening adapted to be closed by the sliding fastener. Of course, such slide fasteners may be used in other applications as well and need not be confined to use as closures of garment openings and the like.

It is desirable, in connection with such coupling elements (i.e., coils or meanders) to constitute them from a thermoplastic monofilament, preferably of the molecularly oriented type and advantageously of nylon or some other polyamide synthetic resin, a polyester or other resin capable of being drawn or spun into a monofilamentary strand. Since the monofilament has substantial inherent resiliency, the bending or coiling of the strand to form the meander or coil, usually exceeds the elastic limit so that the newly created shape is retained with, possibly, a limited spread or creep. Moreover, the turns resulting from a deformation operation are under stress and it has, therefore, been the practice to perform a thermal setting operation adapted to relieve the stresses and permanently fix the new orientation of the filament in these turns.

In prior-art apparatus, as described above, the coil meander is fed along the periphery of a drum or wheel and there exposed to heat deriving from a radiant heating element juxtaposed with the periphery of the drum or with hot gases contacting the turns of the coupling element in a convective-heating arrangement. As a practical matter, neither of these heating techniques is found to be satisfactory, inasmuch as the turns are heated nonuniformly, with portions of each turn proximal to the heating source or more remote from the drum surfaces, being heated to an extent in excess of the heating of those portions of the coil or meander proximal to the wheel and remote from the heating source.

Another disadvantage is that the wheel acts as a heat sink and draws thermal energy away from the meander or coil in the heating zone to maintain the portions of the turns which are remote from the heating source in a somewhat cooler condition than the portions of the turns proximal to the source. Aside from the obvious disadvantage that the proximal portions of the coupling elements may be overheated at temperatures sufficient to bring the distal portions to the level necessary to relieve stress and permanently set the synthetic resin, there is the disadvantage that thorough and uniform heating of the entire coil is a time-consuming operation, greatly slowing the rate of production of the coupling elements or requiring processing apparatus of considerable size.

It is, therefore, the principal object of the present invention to provide an improved method of fixing coupling elements of the coil or meandering type for a slide fastener, which yields a coupling element uniformly free from stress at relatively low cost.

Another object of this invention is to provide an apparatus for thermally fixing synthetic resin coupling element turns at relatively high rates.

These objects and others which will become apparent hereinafter, are attained, in accordance with the present invention, with a system in which the coupling elements are thermally fixed by generating the heat necessary to fix these elements within the thermoplastic monofilament with the aid of ultrasonic vibration.

While ultrasonic vibration has been used to weld members together at an interface, it has not heretofore been recognized that with ultrasonic vibrations it is possible to set a stressed filament to its new configuration nor has it been recognized that ultrasonic vibrations may be used to uniformly heat the turns of a coupling element regardless of the fact that some portions of each turn of the coupling element inevitably will be closer to the source of the ultrasonic vibrations than other parts. It is indeed most unexpected to find that proximal portions of each coupling turn, i.e., portions which lie closer to the source of ultrasonic vibration are heated as uniformly as the more distal portions, and further that the heating occurs without an interface between two thermoplastic materials.

The term "ultrasonic vibration" is used here to refer to the generation of vibrations of supersonic frequency, generally above 15 kHz and preferably to a maximum of about 10 MHz. Such vibrations are generated by ultrasonic transducers which may be of the magnetostrictive type, supplied with the energizing current by a high-frequency oscillator. The transducers, also known as sonotrodes, may also be of the vibrating-reed type.

Suitable ultrasonic vibrators are described in U.S. Pat. Nos. 3,302,277, 3,330,026 and 3,333,323.

The invention is based upon the surprising discovery that, between the anvil and the ultrasonic transducer of the heating and fixing device, a uniform heating of the thermoplastic monofilament can be obtained, in spite of the fact that the geometry of the turns of the coupling coil or the undulations of the meander is extremely complex, provided that the plane of each coupling head (together with the associated turn) lies transverse to the gap between anvil and transducer. It has been found that this system greatly simplifies the thermal fixing of coupling elements so that the process can be carried out in a continuous manner without the disadvantages previously encountered with nonuniform heating.

The system of the present invention permits a reduction in the thermal fixing time of the coupling element to a fraction of a second (e.g., about 0.3 second) and a corresponding increase in the production speed.

Furthermore, it has been discovered that the fixing or setting process, when using ultrasonic transducers of the character described, is unaffected by atmospheric influences (e.g., room temperature) and is able to accomplish thermal setting operations with ultrasonic energy in a well-defined and narrow temperature range. This results in a further advantage in that it is no longer a concern that some parts of the coupling element may be heated excessively while other parts remain unheated or are heated to a level insufficient to destress the synthetic resin.

Another feature of this invention is based upon the discovery that the coupling members (i.e., turns of the coil or undulations of the meander) can be made with highly precise dimensions in a full reproducible and repetitive manner when the coupling element is compressed and shaped simultaneously with thermal setting by pressing the coupling element between the anvil and the ultrasonic transducer. The compression, of course, can be applied generally in the radial direction as the coupling element is fed continuously past the heating arrangement which includes a generally radial anvil or ultra-sonic transducer bearing against the coupling element to hold it under compression. The anvil or transducer can be formed to shape the coupling members as they clamp the coupling element between them, while the periphery of the wheel may likewise be shaped to maintain the predetermined configuration of the coupling element which is nevertheless provided with a configuration close to that desired in the final product. The compression creates an effective energy-transfer coupling between the transducer, coupling element and anvil and ensures rapid and efficient heating of the coupling element.

It has also been found that this system may be used at least in part to affix the remaining parts of a slide fastener half in place. Thus, when a support tape and/or a filler cord is used, it is fed together with the coupling element past the ultrasonic heating cation to form a bond in the boundary areas between coupling elements and support tape and between coupling elements and the filler cord. In general, the coupling elements will be attached to the support tape with a double-chain stitch or the like and the thermal setting of the synthetic resin used to lock the threads to the support tape. The bond between the coupling element and the fastening threads, the filler cord and the support tape may be made effectively even when these latter members are composed of a nonresin.

It has been observed, with respect to this aspect of the invention, that the ultrasonic generation of thermal energy has a tendency to concentrate its effect at the boundary between two bodies which may be joined, e.g., the coupling element and the support tape, the filler cord and/or the stitching securing the coupling element to the filler tape. This boundary or interface generation of heat appears to occur without any substantial internal heating of the coupling element to a level sufficient to bring the surface of the coupling element at the interface to its softening or heat-bonding point. It has already been noted that ultrasonic heating or setting of the coupling element permits a uniform distribution of heat through the cross section of the coupling element in spite of the fact that some portions of the coupling element may be located further away from the sonotrode than other portions, and that this uniform heating occurs in spite of a complicated geometry of the turns or undulations of the coupling element. when, however, the coupling element is used in conjunction with another part of the slide-fastener half, namely a synthetic-resin support tape, a synthetic resin thread for stitching the coupling element to the support tape, and/or a synthetic resin filler cord, there is created an interface with the coupling element at which a substantially higher temperature is generated by the ultrasonic vibrations, this temperature being of a level sufficient to cause fusion of the coupling element to the other member. Surprisingly, this generation of fusion heat does not occur anywhere but at the interface so that substantially no distortion or damage to the coupling element occurs. Reference has been made to support tapes, filler cord and stitching thread or yarn composed of synthetic resin materials and it is intended here to identify as those members which may be used, support tapes, filler cords and threads composed in whole or in part of the synthetic resin, generally in the form of a thermoplastic of the same type as constitutes the coupling element. The synthetic resin may be present in the form of a film-like coating on animal or mineral fibers, as a thermoplastic fiber in a fiber blend with animal, vegetable or mineral fibers and even synthetic resin fibers incapable of thermal fusion, or the like.

Surprisingly, it is found that effective bonding occurs between the thermoplastic coupling element and support tapes, filler cords and attachment threads, even when the latter are not composed of synthetic resins or have no thermoplastic characteristics in themselves. While the theoretical rational for this surprising result has not been fully evaluated, it appears that the coupling element is in frictional contact with the nonthermoplastic member and, as a result of mechanical vibration at the interface and the friction forces developed there, considerable heat is developed to induce the thermoplastic to penetrate the nonthermoplastic materials and create a fusion or intermingling of the thermoplastic and the nonthermoplastic fibers. Thus, while a true thermal fusion occurs when the support tapes, filler cords and attachment stitches are composed of thermoplastic material, an intimate mechanical bond as a result of interpenetration occurs at the interface of the thermoplastic coupling element with nonthermoplastic support tapes, filler cords and stitching threads. In spite of the relatively high temperature developed at the contact points or interfaces, there is no detriment to the coupling element itself.

Another aspect of this invention resides in the provision of an apparatus for the setting of thermoplastic coupling elements in the form of coupling coils or coupling meanders as described generally above. The apparatus of the present invention comprises a transport wheel whose periphery is formed with die halves or cavities of an appropriate configuration, determined by the configuration of the coupling turn or undulation to be received therein. The cavities or seats in the periphery of the transport wheel or drum receive the individual coupling heads after they have generally been formed by bending elsewhere, the coupling elements being pressed into the seats.

According to an important feature of this invention, the transport disk or wheel forms an anvil against which the sonotrode or ultrasonic transducer is juxtaposed. The sonotrode is generally radially displaceable according to this invention toward and away from the periphery of the drum and may be formed with a mating die configuration such that the turns of the coupling elements are pressed and shaped while being heated by ultrasonic vibrations. An arrangement of this type is found to be relatively simple and effective without a tendency toward breakdown and with the ability to process coupling elements at high rates.

While it has been pointed out that the preferred construction provides the transport wheel as the anvil and counterelement shifted toward and away from the periphery of the transport wheel as the sonotrode or ultrasonic transducer, the kinematic opposite of this construction, wherein the sonotrode is provided on the wheel and the anvil is radially displaceable toward and away from the periphery of the wheel, is also possible.

To maintain the coupling elements tightly in the respective seats, there may be provided along the periphery of the transport wheel one or more pressure rollers upstream from the setting station and designed to urge the coupling heads into the respective pockets of the rollers.

The above and other objects, features and advantages of the present invention will become more readily apparent from the following description, reference being made to the accompanying drawing in which:

FIG. 8 is a cross section taken along the line VIII — VIII of FIG. 6;

FIG. 9 is a plan view of the region of FIG. 8; and

FIG. 10 is a cross-sectional view taken along the line X — X of FIG. 6.

Figure 1:
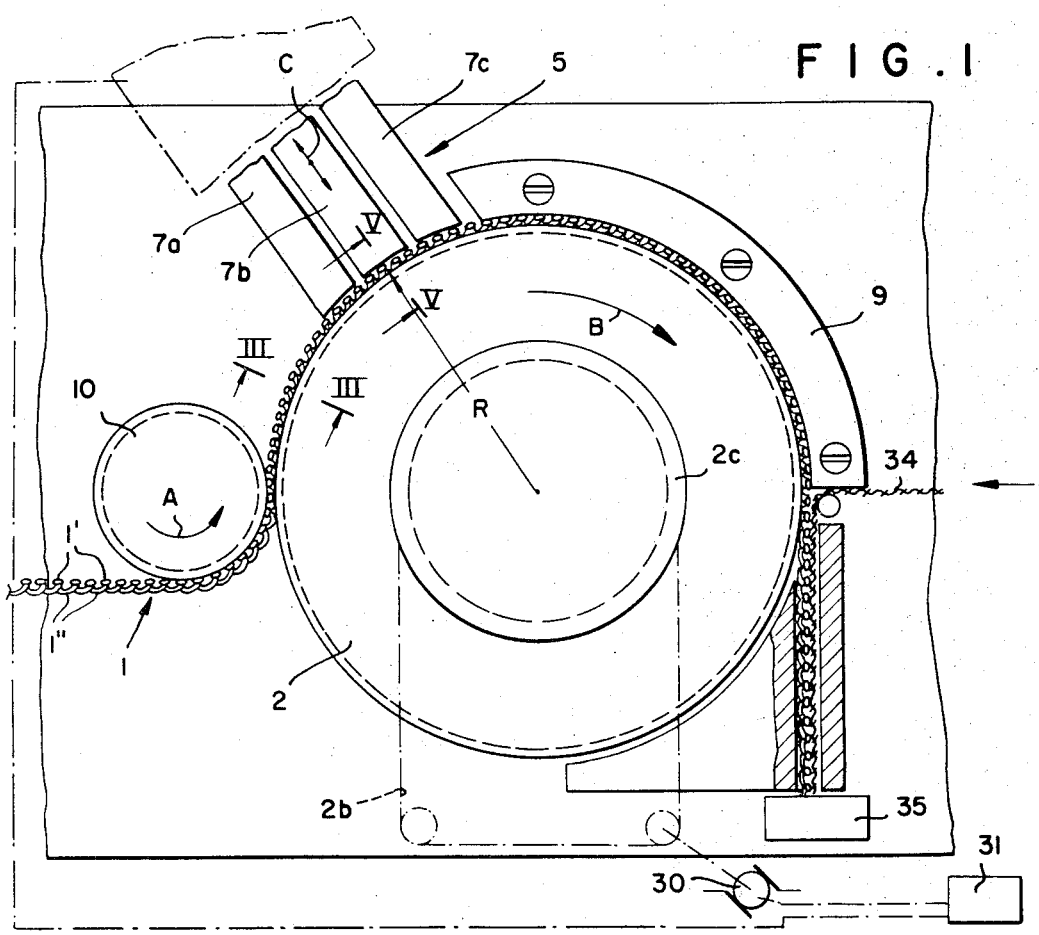
FIG. 1 is a side-elevational view, partly broken away and partly diagrammatic in form, of an apparatus for carrying out the thermal fixing of coupling elements in accordance with the present invention.
Figure 2:
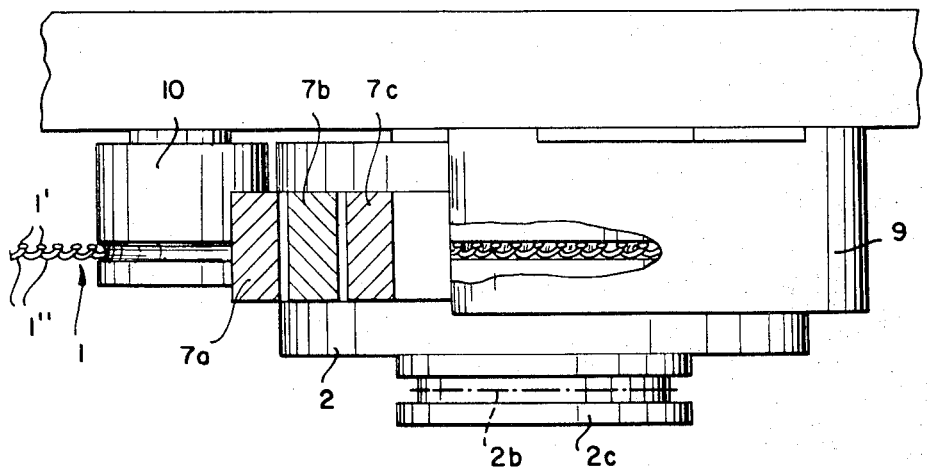
FIG. 2 is a top view of the apparatus of FIG. 1, partly broken away.

In FIGS. 1 and 2, there is shown an apparatus for the thermal fixing of a slide fastener coupling chain or element which is represented diagrammatically at 1 and can be a coil or meander of a thermoplastic monofilament whose heads 1' are interconnected by bights 1'', the coupling element being formed by coiling the monofilament on a mandrel or depositing undulations upon a carrier.

Figure 3:
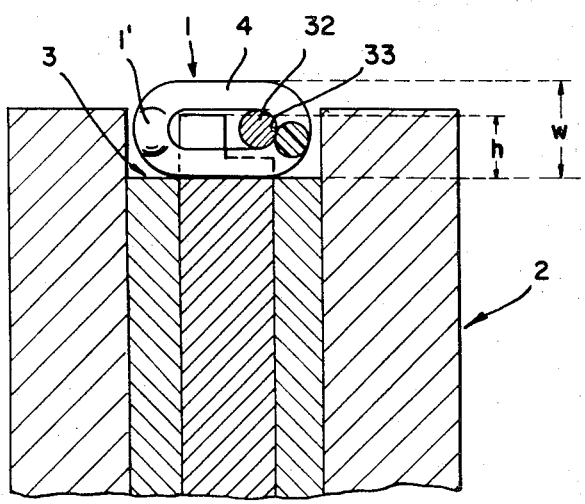
FIG. 3 is a cross section taken along the line III — III of FIG. 1.

Basically, the apparatus comprises a transport wheel, disk or drum 2 which, as can be seen in FIG. 3, is provided with a multiplicity of die heads or beds 3 in which the individual undulations or turns (shown at 4) can be received. To maintain the gauge of these turns between them, the bed 3 of the transport disk 2 is provided with radially extending sprockets $2a$ of a height $h$ which is less than the width $w$ of the turns 4 as measured in a plane perpendicular to the direction of advance of the coupling element and to the axis thereof.

The disk or wheel 2 is driven by a chain $2b$ passing over a sprocket wheel $2c$ rigid with this disk and running to a motor shown diagrammatically at 30. The motor is, in turn, controlled by a programmer 31 which radially reciprocates the sonotrode devices $7a - 7c$ as will be apparent hereinafter. Along the path of the coupling element 1 which is applied against the periphery of the transport disk 2 by a pressure roller 10 rotated as shown by arrow A in a sense opposite the sense of rotation (arrow B) of the transport disk 2, the coupling element is brought to a heating station 5 extending over a limited portion of the periphery of the transport wheel.

In the embodiment illustrated in FIG. 1, the heating station occupies approximately 30° of the periphery of the disk which has, at the heating station, a radius represented at R.

As previously noted, the transport drum may be provided as the ultrasonic transducer, in which case an anvil is provided adjacent the periphery of the disk. However, it is preferred to constitute the disk or drum 2 at the anvil for coaction with the ultrasonic transducer in the form of a sonotrode assembly, here shown to consist of three shaped sonotrode bodies $7a$, $7b$ and $7c$ spaced one ahead of the other in the direction of advance of the coupling element (arrow B). As is also evident from FIG. 1, the vibratile members $7a - 7c$ are oriented with a slight inclination to the radius in lagging relationship, i.e., along secants of the disk or drum inclined in the direction of advance thereof to the radius. The vibratile forces of these sonotrodes thus act with a component in the direction of rotation to facilitate such rotation.

In principle, the sonotrodes (or the single sonotrode illustrated in FIG. 6) may be inclined to the radius R in the lagging relationship illustrated in FIG. 1 so as to provide a contribution in the sense of rotation of the drum or in a leading relationship in which the sonotrode acts as a continuous ultrasonically heated shaping press. Futhermore, the inclination is relatively slight, e.g., of a maximum of about 30°, so that the sonotrode assemblies can be considered as oriented and vibrating generally in a radial direction.

The sonotrodes $7a - 7c$ are radially displaceable into and out of engagement with the coupling element as it is transported past, as represented by the arrow C in FIG. 1, via an electromagnetic device such as the solenoid 8 under the control of programmer 31 and in the cadence of advance of the motor 30. The sonotrode assembly 7, 8 may, moreover, have the magnetostrictive characteristics, energization, circuitry and construction described and illustrated in one of the aforementioned U.S. patents.

Figure 4:
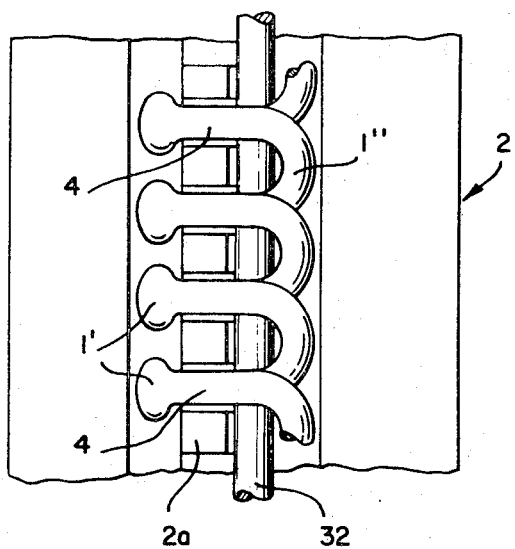
FIG. 4 is a plan view of the region shown in FIG. 3 with the sonotrode removed.
Figure 5:
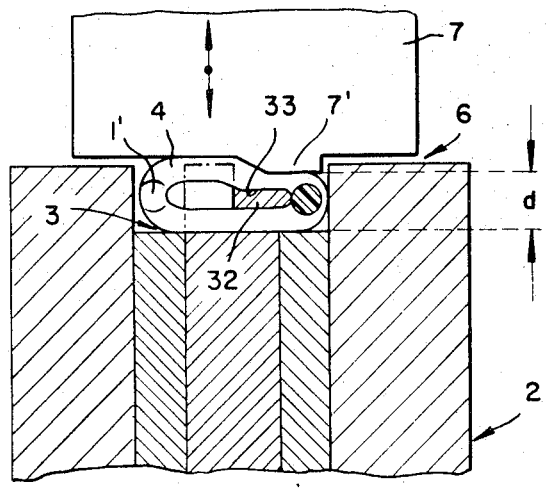
FIG. 5 is a section taken along the line V — V of FIG. 1.

As is best seen from FIGS. 3 – 5, the sonotrode assembly is so arranged that the distance between the periphery of the drum 2 and the face of the sonotrode confronting the drum periphery, is less than the width w as measured from the bottom of the bed 3 and as illustrated at d in FIG. 5. Consequently, the sonotrode member 7a – 7c constitutes press rams which may have formations (e.g., 7' in FIG. 5) which directly engage the turn 7 of the couling element to compress the turns of the coupling element simultaneously with the vabration thereof at ultrasonic frequencies to set and destress the coils. Consequently, the anvil and transducer arrangement also functions as a press imparting the final shape to the coupling elements.

In FIGS. 4 and 5 it has been shown that it is also possible to insert a filler cord 32 in the coupling element, the coupling element being squeezed at 4' against this filler cord. As has also been noted earlier, the heat generated at the interface 33 between the filler cord and the coupling element generally suffices to bond the two together firmly when the filler contains some thermoplastic fibers or consists entirely thereof. When the filler cord is composed of nonthermoplastic fibers, a heat seal does not occur at the interfaces 33, but rather a bond is formed by interpenetration of thermoplastic material into the interstices between the fibers of the cord and by penetration of the fibers of the cord into the coupling element. At the conclusion of the heating operation, the filler cord is maintained under compression. It should also be clear, however, that the filler cord may be omitted entirely or, as will be apparent from FIGS. 6 – 10, can be joined by the support tape, etc., in the heating zone.

In the heating zone 5, heat is generated at the contact surfaces of the sonotrode and anvil with the coupling coil and throughout the turns of the coupling element in the heating zone in a uniform and surprisingly rapid manner. The heating time takes only a fraction of a second (e.g., 0.3 seconds).

Downstream of the heating zone 5 along the periphery of the transport drum 2, there is provided an aftertreatment chamber represented at 9 in which the loss of heat from the coupling coil 4 is restricted by reflection or controlled cooling. The length of the aftertreatment chamber 9 is selected such that the setting of the coil or meander is complete by the time the coupling element 1 passes from this chamber. As shown in FIG. 1, the cooled coupling element may be affixed to a support tape 34 by interweaving, stitching or the like in any conventional menner at a station 35 downstream of the transport drum 2.

Figure 6:
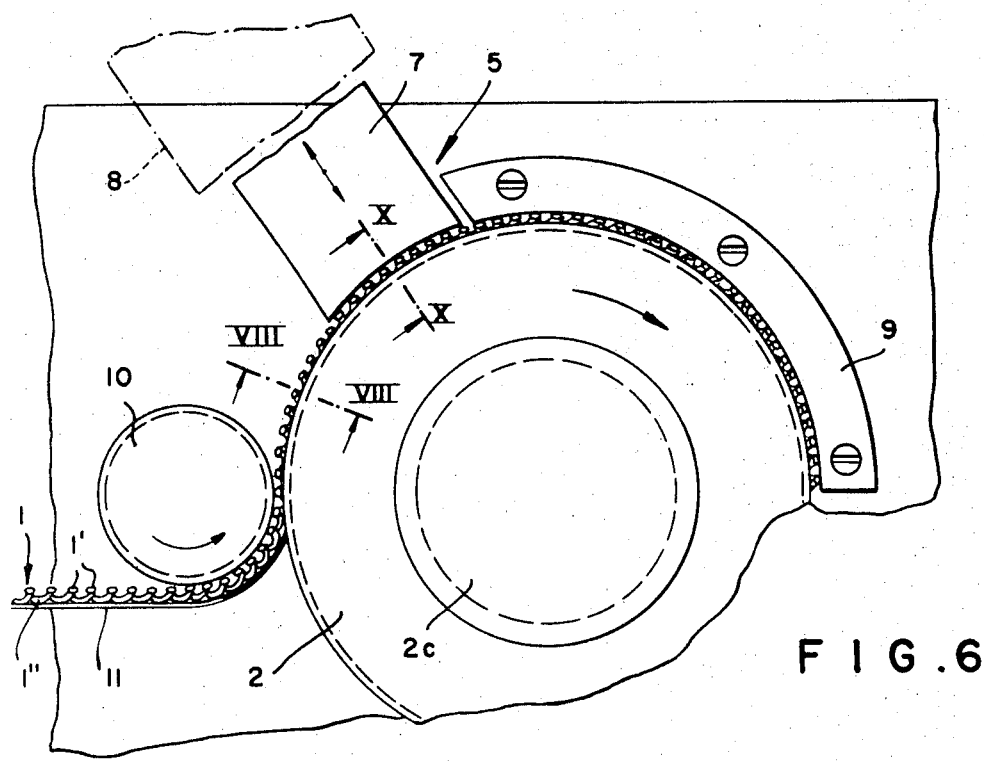
FIG. 6 is a view generally similar to FIG. 1 but showing the use of the present invention for the simultaneous thermal fixing of the coupling element and the bonding thereof to a support tape.
Figure 7:
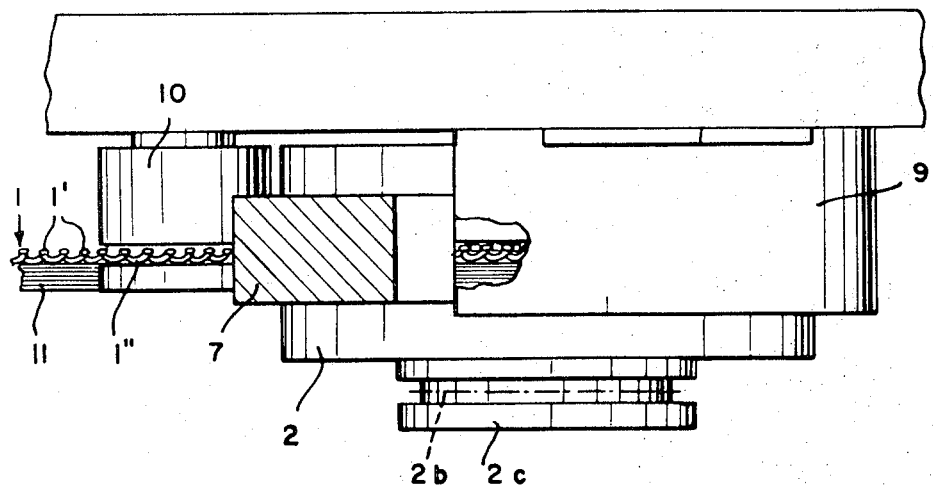
FIG. 7 is a plan view similar to FIG. 2 but constituting a top view of the device of FIG. 6.

FIGS. 6 – 10 show a modified arrangement wherein the coupling element 1, whose individual turns are represented at 4 as previously described, is fed with a support tape 11 of fabric consisting entirely of nonthermoplastic fiber or entirely of thermoplastic thread, or partly of thermoplastic and partly of nonthermoplastic thread. The support tape 11 is fed between the roll 10 and the drum 2 as can be seen in FIG. 6 to move with the coupling element 1 past the sonotrode 7, here shown as a single ultrasonic transducer spanning an arc of about 30° along the periphery of the drum 2 and lying along a radius thereof.

From FIG. 8 it can be seen that the bed 103 in which the coupling element 1 and the tape or band 11 is fed, is provided with a cylindrical shoulder 102a along which the tape can extend axially away from the coupling element 1 at the sides thereof underlying the bights 1" of the coupling element. The coupling element 1 may be stitched to the tape 11 by chain stitches represented at 13 of a nonthermoplastic thread or a thread containing thermoplastic fibers, the running loops of the thread being shown at 13' beneath the tape 11.

To accommodate the running loops 13', the cylindrical portion 102a of the drum 2 is formed with a groove 102b. As will also be apparent from FIGS. 8 and 10, the bed 103 is provided with sprocket teeth to maintain the spacing of the heads 1' of the coupling element. A filler cord 12 runs through the coupling element and is stitched through by the chain stitching 13 to firmly anchor the coupling element in place. When the sonotrode 7 descends (FIG. 10), it compresses the bight portion of the coupling element about the filler cord 12 and heats the coil 1 to a point at which all stresses therein are relaxed as previously described. Simultaneously, high temperatures are developed at the contact region 13a and 13b between the thread and the coupling element and the thread and the tape 11 so that a fusion is permitted at this point. Similarly the interface 14 between the coupling element 1 and the tape 11 generates an elevated temperature to fuse the coupling element to the tape while similar interfacial heating causes fusion at the contact points 12' between the coupling-element turns and the filler cord 12.

We claim:

1. A method of making slide fasteners comprising the steps of forming a continuous coupling element from a continuous strand of a thermoplastic molecularly oriented synthetic resin monofilament by repetitively bending the strand to form a continuous chain of interconnected coupling heads internally stressed at the bends;

inserting said heads and the bends associated therewith continuously into respective beds and compressing the coupling heads;

internally destressing the chain by subjecting same heads to ultrasonic vibration while maintaining them under compression of a level sufficient to ultrasonically heat and relax said chain;

cooling said chain subsequent to the relaxation thereof; and affixing said coupling element to a support tape.

2. The method defined in claim 1, further comprising the step of inserting a filler cord into said coupling chain prior to the compression thereof and bonding said chain to said filler cord at least in part without energy of said ultrasonic vibration.

3. The method defined in claim 2 wherein said coupling chain is bonded to said support tape at least in part by the energy of said ultrasonic vibration.

4. The method defined in claim 2 wherein said coupling chain is stitched to said support tape.

* * * * *